Patented June 12, 1951

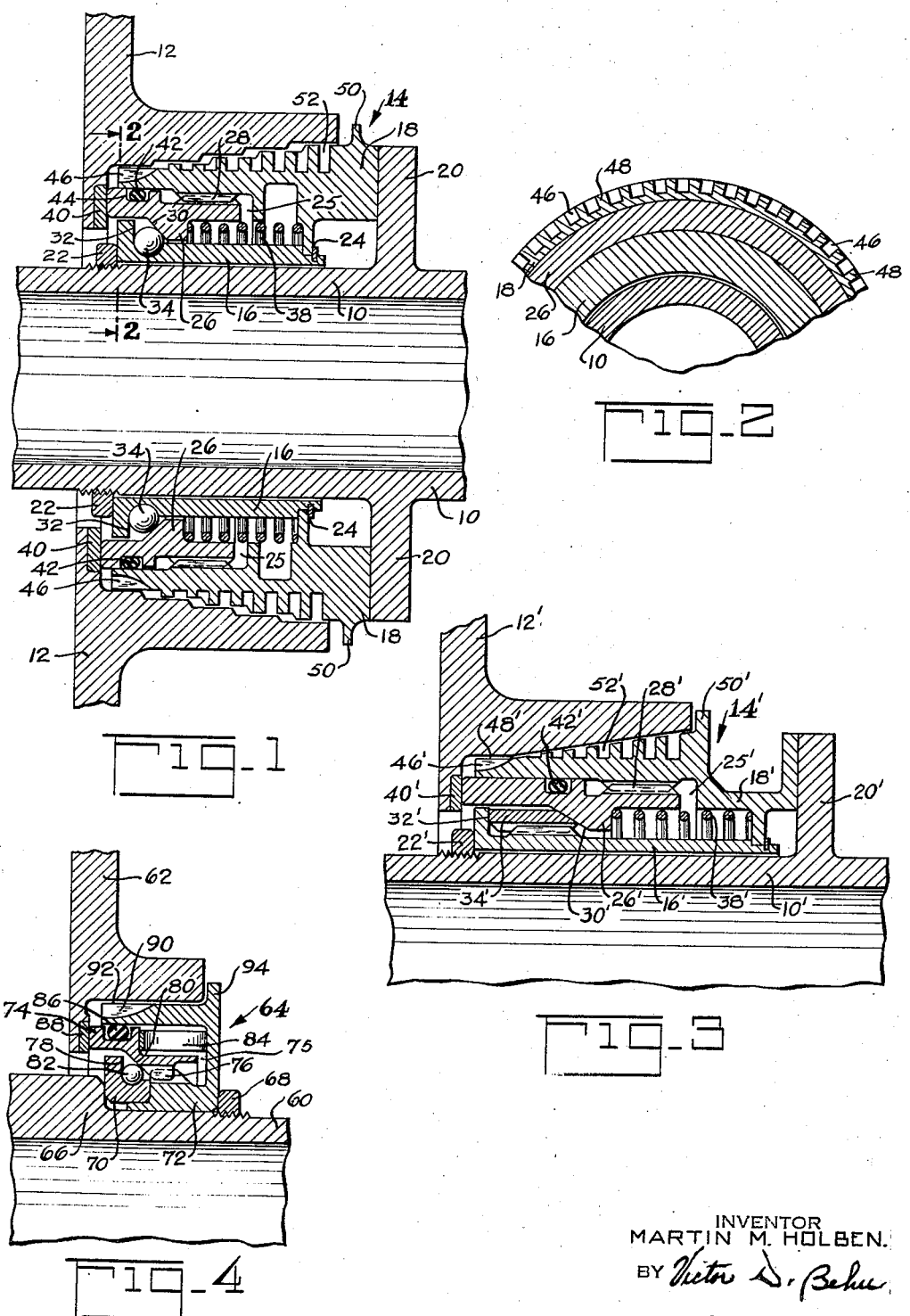

2,556,393

UNITED STATES PATENT OFFICE 2,556,393

SHAFT SEAL

Martin M. Holben, Ridgewood, N. J., assignor to Wright Aeronautical Corporation, a corporation of New York Application September 13, 1947, Serial No. 773,761

10 Claims. (Cl. 286—11.11)

This invention relates to fluid seals for rotating shafts and is particularly directed to a shaft seal which is effective when the shaft is rotating at high speeds, low speeds, or when the shaft is stationary.

A face type seal is capable of providing a satisfactory shaft seal when the shaft is stationary as well as when the shaft is rotating. However, in conventional face type seals scuffing of the rubbing faces of the seal may occur at high shaft speeds. An object of the present invention comprises the provision of a face type seal in which the contact pressure on the seal faces is reduced at high shaft speeds thereby minimizing any tendency of the seal to scuff at said high speeds.

Specifically the invention comprises a face seal for a shaft in which the face seal surfaces are urged into engagement by a spring. Suitable weights, rotatable with said shaft, are effective to progressively relieve this spring force as the speed of the shaft increases. In addition means are provided to cause the liquid to be sealed to rotate with the shaft as said liquid approaches said face seal such that the centrifugal forces acting on said liquid also help to prevent its leakage.

Other objects of the invention will become apparent upon reading the annexed detailed description in connection with the drawing in which:

Figure 1 is an axial sectional view through a shaft seal embodying the invention;

Figure 2 is a sectional view taken along line 2—2 of Figure 1; and

Figures 3 and 4 are axial sectional views of modified forms of the invention.

Referring to the drawing, a shaft 10 extends through a housing or support member 12. A seal assembly 14 is secured to the shaft 10 to prevent leakage of lubricating oil or other liquid in a leftward direction (Figure 1) along the shaft 10. Said seal assembly comprises a pair of abutting annular members 16 and 18 clamped between a shoulder 20 and a nut 22 on the shaft 10 whereby said annular members are rigid with said shaft. A split ring 24 may be provided to secure the members 16 and 18 together so that they may be handled as a unit structure before they are clamped to the shaft 10.

The members 16 and 18 are shaped to form an annular axially opening channel 25 therebetween into which a seal ring 26 extends. The seal ring 26 is axially splined to the member as indicated at 28, whereby said ring is axially movable relative to and is rotatable with the shaft 10. In addition the seal ring 26 is provided with a shoulder 30 within said channel 25, said shoulder 30 facing a shoulder 32 of the member 16 adjacent the outer edge of said channel. A plurality of spherical balls 34 are disposed between said shoulders and a compression spring 38, disposed between said seal ring 26 and the bottom of said channel, urges said shoulders 30 and 32 against the balls 34. In addition, the surface of the shoulder 30, engaged by the balls 34, is conical so as to resist radially outward movement of said balls. With this arrangement, and upon rotation of the shaft and seal assembly, each ball 34 rotates therewith and is urged radially outwardly under the action of a centrifugal force acting thereon whereby each ball 34 acts against the shoulder 30 to urge the seal ring 26 against the spring 38.

The end of the seal ring 26 remote from the spring 38 is flat and is arranged to engage the flat face of an insert member 40 secured to the housing member 12 to provide a face seal between said insert member and seal ring. A suitable gasket 42 is disposed between the annular member 18 and the seal ring 26. Preferably the gasket ring 42 comprises a ring of resilient rubber-like material disposed in an annular groove 44 which, as illustrated, is formed in the annular member 26. The arrangement is such that the gasket ring 42 is in radial compression when disposed within the groove 44 between the ring 26 and the member 18. In addition, the axial width of the gasket ring 42, when compressed in the groove 44 between the seal ring 26 and the member 18, is preferably less than the axial width of said groove.

The annular member 18 is provided with a stepped external profile such that the external diameter of said member decreases in steps toward the face seal between the insert member 40 and seal ring 26. The housing member 12 is provided with an axially extending portion surrounding the member 18 and having a stepped profile fitted about the step profile of the annular member 18 with but a small radial clearance therebetween, and with a substantial axial clearance between said steps. This substantial axial clearance between the steps on the members 12 and 18 is provided to permit relative axial movement and displacement between these members. The end of the annular member 18 adjacent said face seal is also provided with a plurality of notches 46 on its external surface thereby forming vanes 48. This construction provides an annular leakage path between the annular member 18 and the surrounding portion of the housing member 12. The end of this leakage path remote from the face seal has a radius substantially larger than the outer radius of the face seal and preferably larger than the radius of the outer edge of the vanes 48.

With this construction, when the shaft 10 is stationary, or rotating at a slow speed, leakage of lubricating oil or other liquid in a leftward direction along the shaft 10 is prevented by the face seal formed by the engaging flat surfaces of the insert member 40 and the seal ring 26. This oil or other liquid flows along the leakage path between the annular member 18 and the housing member 12 to said face seal where further flow is prevented. Also, although the seal ring 26 is free to move axially relative to the annular members 16 and 18 and the shaft 10, this seal ring 26 rotates with said members and shaft so that the gasket ring 42 provides an effective seal therebetween. Thus the gasket ring 42 prevents leakage around the seal ring 26 in parallel to the face seal provided by the engaged faces of the seal ring 26 and insert member 40.

As the speed of the shaft increases, centrifugal force acting on the spherical balls progressively relieves part of the pressure of the seal ring spring 38 so that the contact pressure between the face seal surfaces progressively decreases as the speed of the shaft 10 increases. At these higher shaft speeds any oil or other liquid which tends to leak down between the relatively lightly engaged face seal surfaces is caused to rotate with said surfaces and therefore is thrown radially outwardly by resulting centrifugal forces acting on said liquid. In addition, and particularly at these high shaft speeds, the vanes 48 act as a centrifugal pump to prevent liquid from flowing radially inwardly past said vanes toward the face seal surfaces. With this operation an effective seal is provided at all shaft speeds and as the shaft speed increases the contact pressure on the face seal progressively decreases.

The annular path between the housing member 12 and the rotating member 18 flares outwardly away from the face seal and the vanes 48, thereby facilitating the pump action of the vanes 48. In addition, for maximum effectiveness of said pumping action, the radial clearance between the rotating member 18 and the housing member 12 should be as small as practical. Obviously the magnitude of this clearance can be increased when a liquid of high viscosity is being sealed and/or when the linear peripherical speed of the rotatable member 18 is increased. In a given installation in which the liquid to be sealed is engine lubricating oil having a viscosity of 120 Saybolt Universal seconds at 210° F. and the linear peripherical speed of the member 18 is approximately 125 feet per second, the radial clearance between the housing member 12 and the rotatable member 18 is preferably of the order of .01 inch.

The rotatable member 18 may also be provided with a radially extending flange 50 at the end, remote from the vanes 48, of the annular path between said member 18 and the housing member 12. With the flange 50, any oil or other liquid flowing down between the housing member 12 and said flange, tends to rotate with said flange and therefore is thrown radially outwardly from said leakage path. Obviously the magnitude of this effect increases with increase in the radial extension of the flange 50 outwardly beyond the adjacent inner diameter of the housing member 12 and with decrease in the axial clearance between said flange and housing. Thus the axial clearance between the flange 50 and the housing member 12 also should be as small as practical, and if possible, preferably of the same order of magnitude as the radial clearance between the members 12 and 18.

As an additional means to help prevent leakage of oil or other liquid toward the face seal along the annular path between the housing member 12 and the rotatable member 18, a spiral groove or grooves 52 is or are provided on the external surface of the member 18 between its flange 50 and its vanes 48. The direction of the spiral groove is such that its end adjacent the vanes 48 points in the direction of rotation of the shaft 10 whereby said spiral path helps to prevent leakage along the clearance between the housing member 12 and the rotatable member 18.

In a particular installation, the centrifugal pumping action of the vanes 48 and the spiral groove 50 may be sufficient to prevent leakage to the face seal surfaces at high shaft speeds. Accordingly in such an installation, the design may be such that the spherical balls 34 are effective to entirely separate the seal ring 26 and insert member 40 at said high speeds. Whether the face seal surfaces are entirely separated or whether the pressure on these surfaces is only lessened at high shaft speeds, scuffing of said face seal surfaces is minimized.

The structure of Figure 3 is substantially the same as that of Figure 1 and each part of Figure 3 has been designated by a like but primed reference numeral as the corresponding part of Figure 1. In Figure 3 the adjacent surfaces of the housing member 12' and annular member 18' are conical instead of stepped. In addition, the spherical balls 34 of Figure 1 have been replaced by a plurality of weights 34' splined to the annular member 16'. The structure of Figure 3 is otherwise identical to that of Figure 1 so that the operation of Figure 3 should be apparent without further description.

In Figure 3, the spline connections between the weights 34' and the annular member 16' positively insure rotation of said weights with the shaft 10'. If desired means may be provided in Figure 1 to positively insure rotation of the spherical balls 34 with the shaft 10. For example, suitable flanges may extend between the balls 34 from the seal ring 26 and/or the annular member 16 thereby positively forcing the balls 34 to rotate with the shaft 10.

The spiral grooves 50 and 50' of Figures 1 and 3, although beneficial, are not essential to the operation of the seal. Figure 4 discloses a modified construction in which said grooves have been eliminated. Elimination of said spiral grooves makes for a much shorter seal thereby permitting its use when only a relatively small axial space is available for the seal.

In Figure 4, a shaft 60 extends through a housing or support member 62. A seal assembly 64 is clamped between a shoulder 66 and a nut 68 on the shaft 60. This seal assembly comprises a pair of annular members 70 and 72 rigid with the shaft 60. In addition, a seal ring 74 extends into an axially opening annular channel 75 between said annular members 70 and 72 and is axially splined thereto as indicated at 76. The members 70 and 74 have facing shoulders 78 and 80, and a plurality of spherical balls 82 are disposed between said shoulders. A spring 84 is disposed between the seal ring 74 and the member 72 to urge said shoulders against the balls 82. As illustrated in Figure 4, the spring 84 is a wave type spring instead of the more usual form of helically coiled spring of Figures 1 and 3. The wave type spring is preferable since the centrifugal forces acting on a helically coiled spring may expand one or more of its coils into frictional engagement with its adjacent walls.

The seal ring 74 is provided with an annular groove within which a gasket ring 86, similar to the gasket ring 42 of Figure 1, is disposed. The end of the seal ring 74 is flat and is arranged to engage the flat face of an annular insert member 88 secured to the housing 62. The shoulder 80 of the seal ring 74 is conical such that upon rotation of the shaft 60 the balls 82 tend to move radially outwardly against said conical shoulder thereby urging the seal ring 74 against the spring 84 and away from the insert member 88. The end of the annular member 72 adjacent the insert member 88 is provided with a plurality of notches 90 in its external surface similar to the notches 46 of Figure 1 thereby forming vanes 92 similar to the vanes 48 of Figure 1. The vanes 92 act as a centrifugal pump which at high shaft speeds is effective to pump oil or other liquid back along an annular leakage path between the annular member 72 and the housing member 62.

The end of the annular member 72 remote from the face seal surfaces is provided with a flange 94 extending radially outwardly of the adjacent internal diameter of the housing member 62. In this way any oil or other liquid flowing in the annular path between the housing member 62 and the flange 94 tends to rotate with said flange and therefore is thrown radially outwardly from said path. As previously mentioned, the magnitude of this effect increases with increase in the radial extension of the flange 94 outwardly beyond the adjacent inner diameter of the housing member 62 and with decrease in the axial clearance between said flange and housing member.

In all of the aforedescribed modifications, a face seal prevents leakage along the shaft when the shaft is stationary or rotating. As the speed of the shaft increases the contact pressure on the engaged face seal surfaces decreases thereby minimizing scuffing of the face seal surfaces at the higher shaft speeds. Although the contact pressure of the engaged face seal surfaces decreases as the shaft speed increases, the effect of centrifugal force on any oil or other liquid tending to leak between said face seal surfaces increases with increase of shaft speed, thereby maintaining the effectiveness of the seal as the speed of the shaft increases. In addition, with the rotating vanes 48, 48' or 92 the face seal surfaces may entirely disengage at high shaft speeds, the effectiveness of the seal being maintained by the centrifugal pumping action of said vanes.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. An assembly for providing a seal between a housing member and a shaft rotatable relative to and extending through said housing member: said assembly comprising annular means rigid with said shaft and radially-spaced therefrom at one end to form an annular axially-opening channel; a seal ring extending into said channel; means connecting said seal ring to said shaft for rotation with and for axial movement relative to said shaft; a spring for urging said seal ring in a direction axially outwardly of said channel toward engagement with a surface on said housing member to provide a face seal between said housing member and seal ring; means rotatable with said shaft for urging said seal ring against said spring with a force which increases with increase in speed of said shaft; said seal ring having an annular groove facing an adjacent surface rigid with said shaft; and an annular gasket of resilient rubber-like material disposed in said annular groove; said gasket, when disposed in said groove, being in radial compression between the bottom of said groove and said shaft surface and having an axial width less than the width of said groove.

2. An assembly for providing a seal between a housing member and a shaft rotatable relative to and extending through said housing member: said assembly comprising annular means rigid with said shaft and radially-spaced therefrom at one end to form an annular axially-opening channel; a seal ring extending into said channel; means connecting said seal ring to said shaft for rotation with and for axial movement relative to said shaft; a spring for urging said seal ring in a direction axially outwardly of said channel toward engagement with a surface on said housing member to provide a face seal between said housing member and seal ring; means rotatable with said shaft for urging said seal ring against said spring with a force which increases in speed of said shaft; and an annular gasket preventing leakage around said seal ring in parallel with said face seal; said housing member having a portion surrounding said annular means to provide an annular path therebetween along which liquid tends to leak toward said face seal; the end of said annular means adjacent said face seal being formed with a plurality of radially extending vanes for imparting rotation to any liquid flowing along said path to said vanes.

3. An assembly for providing a seal between a housing member and a shaft rotatable relative to and extending through said housing member; said assembly comprising annular means rigid with said shaft and radially-spaced therefrom at one end to form an annular axially-opening channel; a seal ring extending into said channel; means connecting said seal ring to said shaft for rotation with and for axial movement relative to said shaft; a spring for urging said seal ring in a direction axially outwardly of said channel toward engagement with a surface on said housing member to provide a face seal between said housing member and seal ring; means rotatable with said shaft for urging said seal ring against said spring with a force which increases with increase in speed of said shaft; and an annular gasket preventing leakage around said seal ring in parallel with said face seal; said housing member having a portion surrounding said annular means to provide an annular path therebetween along which liquid tends to leak toward said face seal; the end of said annular means adjacent said face seal being formed with a plurality of radially extending vanes for imparting rotation to any liquid flowing along said path to said vanes; the end of said leakage path remote from said face seal having a radius larger than the outer radius of said face seal.

4. An assembly for providing a seal between a housing member and a shaft rotatable relative to and extending through said housing member: said assembly comprising annular means rigid with said shaft and radially-spaced therefrom at one end to form an annular axially-opening channel; a seal ring extending into said channel; means connecting said seal ring to said shaft for rotation with and for axial movement relative to said shaft; a spring for urging said seal ring in a direction axially outwardly of said channel toward engagement with a surface on said housing member to provide a face seal between said housing member and seal ring; means rotatable with said shaft for urging said seal ring against said spring with a force which increases with increase in speed of said shaft; and an annular gasket preventing leakage around said seal ring in parallel with said face seal; said housing member having a portion surrounding said annular means to provide an annular path therebetween along which liquid tends to leak toward said face seal; the end of said annular means adjacent said face seal being formed with a plurality of radially extending vanes for imparting rotation to any liquid flowing along said path to said vanes; and an annular radially-extending flange on said annular means at the end of said path remote from said face seal.

5. An assembly for providing a seal between a housing member and a shaft rotatable relative to and extending through said housing member; said assembly comprising annular means rigid with said shaft and radially-spaced therefrom at one end to form an annular axially-opening channel; a seal ring extending into said channel; means connecting said seal ring to said shaft for rotation with and for axial movement relative to said shaft; a spring for urging said seal ring in a direction axially outwardly of said channel toward engagement with a surface on said housing member to provide a face seal between said housing member and seal ring; means rotatable with said shaft for urging said seal ring against said spring with a force which increases with increase in speed of said shaft; and an annular gasket preventing leakage around said seal ring in parallel with said face seal; said housing member having a portion surrounding said annular means to provide an annular path therebetween along which liquid tends to leak toward said face seal; the end of said annular means adjacent said face seal being formed with a plurality of radially extending vanes for imparting rotation to any liquid flowing along said path to said vanes; the end of said leakage path remote from said face seal having a radius larger than the outer radius of said face seal; and an annular radially-extending flange on said annular means at the end of said path remote from said face seal.

6. An assembly for providing a seal between a housing member and a shaft rotatable relative to and extending through said housing member: said assembly comprising annular means rigid with said shaft and radially-spaced therefrom at one end to form an annular axially-opening channel; a seal ring extending into said channel; means connecting said seal ring to said shaft for rotation with and for axial movement relative to said shaft; a spring for urging said seal ring in a direction axially outwardly of said channel toward engagement with a surface on said housing member to provide a face seal between said housing member and seal ring; means rotatable with said shaft for urging said seal ring against said spring with a force which increases with increase in speed of said shaft; and an annular gasket preventing leakage around said seal ring in parallel with said face seal; and a helical groove on the external surface of said annular means.

7. An assembly for providing a seal between a housing member and a shaft rotatable relative to and extending through said housing member: said assembly comprising annular means rigid with said shaft and radially-spaced therefrom at one end to form an annular axially-opening channel; a seal ring extending into said channel; means connecting said seal ring to said shaft for rotation with and for axial movement relative to said shaft; a spring for urging said seal ring in a direction axially outwardly of said channel toward engagement with a surface on said housing member to provide a face seal between said housing member and seal ring; means rotatable with said shaft for urging said seal ring against said spring with a force which increases with increase in speed of said shaft; and an annular gasket preventing leakage around said seal ring in parallel with said face seal; said housing member having a portion surrounding said annular means to provide an annular path therebetween along which liquid tends to leak toward said face seal; the end of said annular means adjacent said face seal being formed with a plurality of radially extending vanes for imparting rotation to any liquid flowing along said path to said vanes; and a helical groove on the external surface of said annular means and extending from said vanes toward the other end of said annular means.

8. An assembly for providing a seal between a housing member and a shaft rotatable relative to and extending through said housing member: said assembly comprising a pair of abutting annular members forming an axially opening annular channel therebetween; a seal ring extending into said channel and having an internal shoulder facing a shoulder on one of said annular members adjacent the outer edge of said channel; a plurality of circumferentially spaced weights disposed in said channel between said shoulders; the surface of the shoulder on said ring being conical so as to resist radially outward movement of said weights; a spring for urging said seal ring axially outwardly of said channel thereby urging said shoulders against said weights; an annular gasket between said seal ring and one of said members; and means for clamping said annular members to said shaft with said seal ring urged axially, by said spring, toward engagement with a surface on said housing member for providing a face seal between said housing member and seal ring.

9. An assembly for providing a seal between a housing member and a shaft rotatable relative to and extending through said housing member: said assembly comprising a pair of abutting annular members forming an axially opening annular channel therebetween; a seal ring extending into said channel and having an internal shoulder facing a shoulder on one of said annular members adjacent the outer edge of said channel; a plurality of circumferentially spaced weights disposed in said channel between said shoulders; the surface of the shoulder on said ring being conical so as to resist radially outward movement of said weights; a spring for urging said seal ring axially outwardly of said channel thereby urging said shoulders against said weights; an annular gasket between said seal ring and one of said members; said annular members being rigidly secured together to form a unit structure with the seal ring extending axially therefrom; and means for clamping said unit structure to said shaft with said seal ring urged axially, by said spring, toward engagement with a surface on said housing member for providing a face seal between said housing member and seal ring.

10. An assembly for providing a seal between a housing member and a shaft rotatable relative to and extending through said housing member; said assembly comprising annular means rigid with said shaft and radially-spaced therefrom at one end to form an annular axially-opening channel; a seal ring extending into said channel; means connecting said seal ring to said shaft for rotation with and for axial movement relative to said shaft; a spring for urging said seal ring in a direction axially outwardly of said channel toward engagement with a surface on said housing member to provide a face seal between said housing member and seal ring; means rotatable with said shaft for urging said seal ring against said spring with a force which increases with increase in speed of said shaft; said seal ring having an annular groove facing the adjacent surface of said channel; and an annular gasket of resilient rubber-like material disposed in said annular groove; said gasket, when disposed in said groove, being in radial compression between the bottom of said groove and said channel surface.

MARTIN M. HOLBEN.

REFERENCES CITED

The following references are of record in the file of this patent:

UNITED STATES PATENTS

| Number | Name | Date |
|---|---|---|
| 1,346,924 | Wilfley | July 20, 1920 |
| 1,353,095 | Uttech et al. | Sept. 14, 1920 |
| 1,556,657 | Wilfley | Oct. 13, 1925 |
| 1,976,532 | Wilfley | Oct. 9, 1934 |
| 2,272,454 | Wilfley | Feb. 10, 1942 |
| 2,362,854 | Stephens | Nov. 14, 1944 |